US008484568B2

(12) United States Patent
Rados et al.

(10) Patent No.: US 8,484,568 B2
(45) Date of Patent: Jul. 9, 2013

(54) DATA USAGE MONITORING PER APPLICATION

(75) Inventors: Steven R. Rados, Danville, CA (US); Chris S. Neisinger, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 339 days.

(21) Appl. No.: 12/862,862

(22) Filed: Aug. 25, 2010

(65) Prior Publication Data

US 2012/0054661 A1 Mar. 1, 2012

(51) Int. Cl.
*G06F 13/00* (2006.01)
*G06F 15/00* (2006.01)

(52) U.S. Cl.
USPC .......................................... 715/745; 715/748

(58) Field of Classification Search
USPC .......... 715/740–743, 835–855; 455/405–406; 705/20, 30
See application file for complete search history.

(56) References Cited

U.S. PATENT DOCUMENTS 7,450,927 B1* 11/2008 Creswell et al. .............. 455/405
2011/0276442 A1* 11/2011 Momtahan et al. ............. 705/30

\* cited by examiner

*Primary Examiner* — Cao"Kevin" Nguyen

(57) ABSTRACT

A user device associates a data session with a particular application, of the user device, that initiated the data session. The user device monitors network data usage for the data session and/or receives network data usage from a monitoring device associated with the network. The device stores and/or retrieves statistics for the network data usage associated with the particular application. The device further retrieves subscription plan information associated with the user device and presents, on a display, the statistics for the network data usage associated with the particular application and in relation to the subscription plan information associated with the user device.

23 Claims, 11 Drawing Sheets

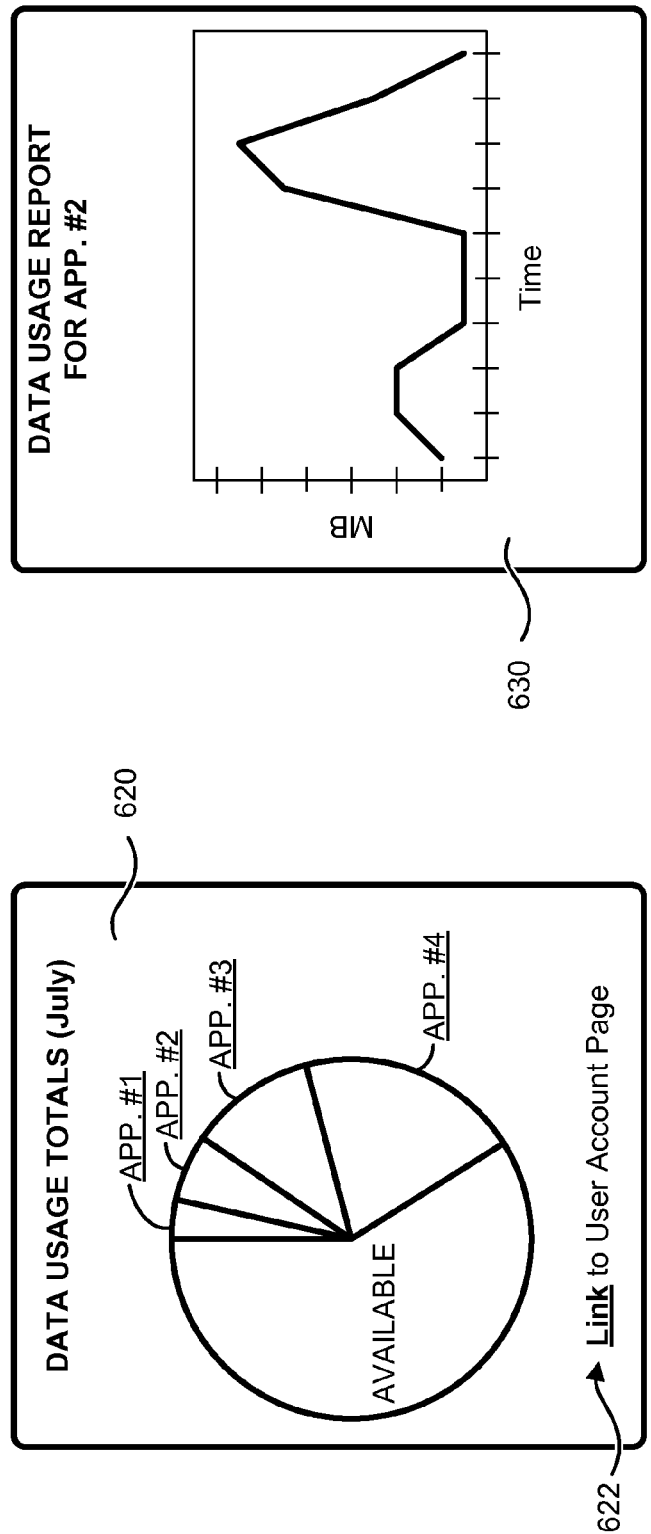

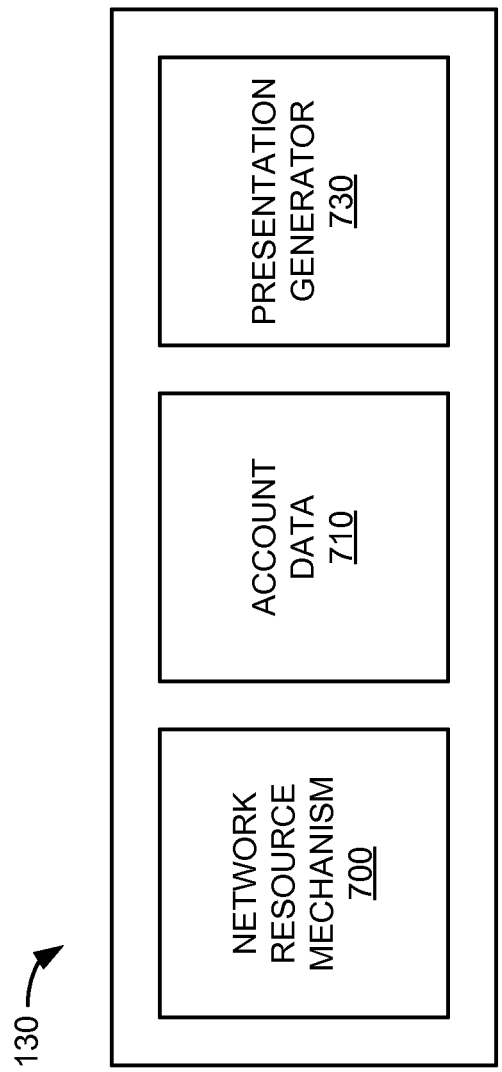

DATA USAGE MONITORING PER APPLICATION

BACKGROUND

Application software, also referred to as an "app," is computer software designed to help a user perform one or more specific tasks. Apps may be downloaded to perform particular tasks for mobile electronic devices (such as personal digital assistants (PDAs), smartphones, multimedia players, gaming systems, etc.) or computing systems (personal computers, laptops, netbooks, etc.). As mobile electronic devices are becoming more prevalent, users may download apps that use a mobile data network to transmit and/or receive information. Some mobile electronic devices may include operating systems that have inherent capabilities to transmit and/or receive data without direct end-user involvement. Access to the mobile data network may be based on a subscriber billing plan, which may include a per-megabyte (MB) fee for data usage over the network, a pre-paid MB limit, or unlimited access.

BRIEF DESCRIPTION OF THE DRAWINGS

FIGS. 6A-6C are diagrams of example user interfaces according to implementations described herein;

FIG. 7 is a diagram of example functional components of a tracking device depicted in FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may enable user devices to identify and present, to a user of the user device, which applications on the user device are sending and/or receiving data. The systems and/or methods may also identify how much data each application has used over a particular time period. This application-based data usage information may allow the user to limit unintended use of a mobile data network, such as data usage by applications that request advertising and/or automatic updates without additional input from the user. The systems and/or methods described herein may be implemented within a user device, within a service provider network, or within a combination of a user device and service provider network.

In one implementation, a user device may associate a data session with a particular application that initiated the data session. The user device may monitor network data usage for the data session and/or may receive network data usage from a monitoring device associated with the network. The user device may store and/or retrieve statistics for the network data usage associated with the particular application, and may further retrieve subscription plan information, for the network, associated with the user device. The user device may present, on a display, the statistics for the network data usage associated with the particular application and in relation to the subscription plan information associated with the user device.

As used herein, the terms "customer," "subscriber," and/or "user" may be used interchangeably and are intended to be broadly interpreted to include a user device (e.g., a mobile telephone, a personal computer, etc.) or a user of a user device. Also, the term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
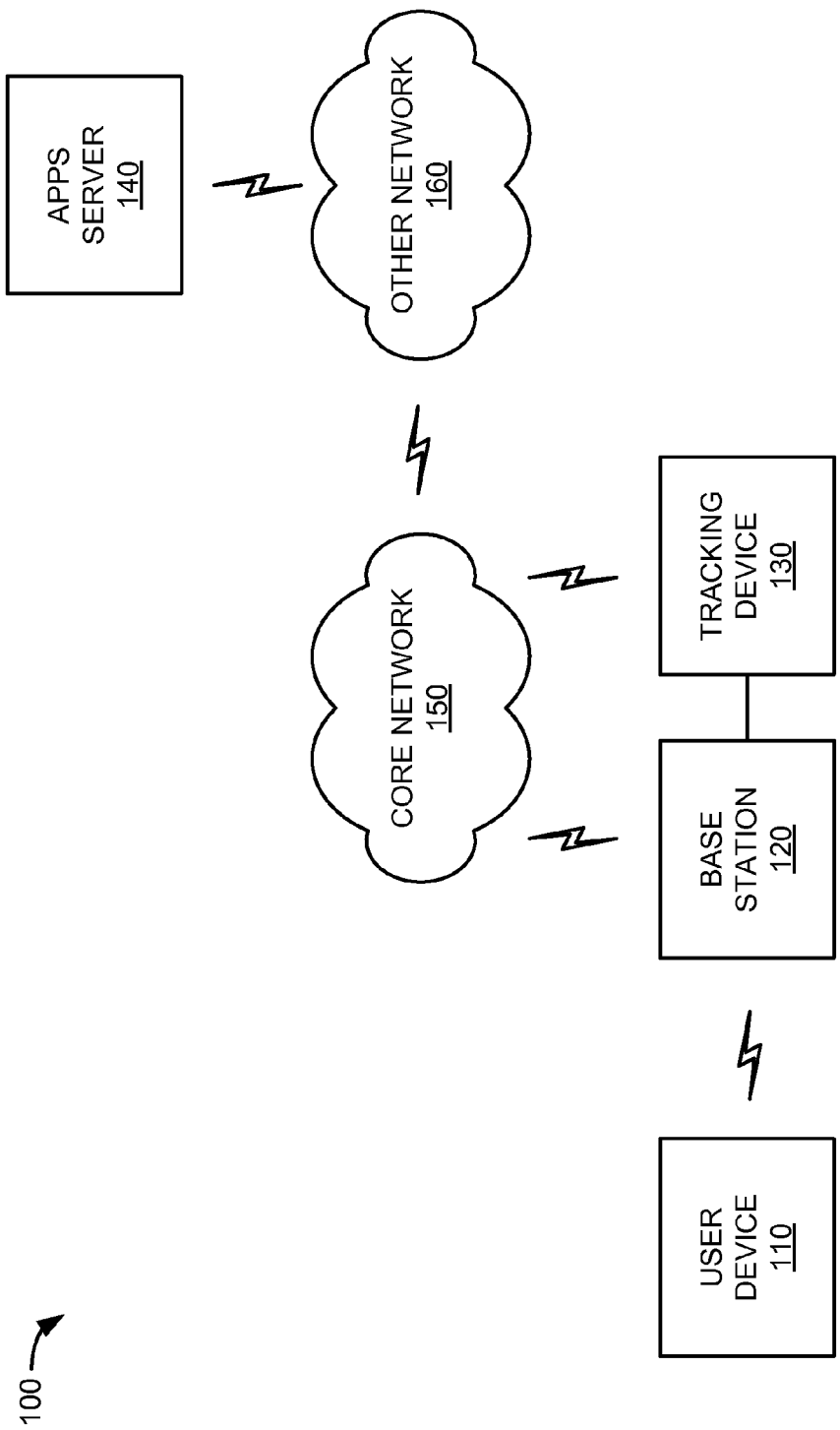
FIG. 1 is a diagram of an example network in which systems and/or methods described herein may be implemented.

FIG. 1 is a diagram of an example network 100 in which systems and/or methods described herein may be implemented. As illustrated, network 100 may include a user device 110, a base station 120, a tracking device 130, an apps server 140, a core network 150, and another network 160. Components of network 100 may interconnect via wired and/or wireless connections. A single user device 110, base station 120, tracking device 130, apps server 140, core network 150, and other network 160 have been illustrated in FIG. 1 for simplicity. In practice, there may be more user devices 110, base stations 120, tracking devices 130, apps servers 140, core networks 150, and/or other networks 160. Also, in some instances, one or more of the components of network 100 may perform one or more functions described as being performed by another one or more of the components of network 100.

User device 110 may include one or more devices capable of sending/receiving information (e.g., voice, data, broadband applications, etc.) to/from base station 120. User device 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a cellular telephone, a smart phone, a laptop computer with a broadband air card, a global positioning system (GPS) navigation device, a digital camera, a portable gaming system, or other types of mobile communication devices. User device 110 may also be referred to as a mobile electronic device.

Base station 120 (also referred to as a "NodeB") may include one or more devices that receive information (e.g., voice, data, broadband applications, etc.) from core network 150 and transmit that information to user device 110 via an air interface. Base station 120 may also include one or more devices that receive information (e.g., voice, data, broadband applications, etc.) from user device 110 over an air interface and transmit that information to core network 150 or other user devices 110.

Tracking device 130 may include one or more server devices, or other types of computation or communication devices, that gather, process, search, and/or provide information in a manner described herein. In one implementation, tracking device 130 may monitor traffic patterns (e.g., packet data traffic patterns) associated with network 100 (e.g., associated with user device 110, base station 120, and/or core network 150), and may classify (e.g., as being associated with a particular type of app) data usage by user device 110 based on the monitored traffic patterns. Tracking device 130 may also provide data usage statistics and/or classifications to user device 110 for presentation to a user. In one example, tracking device 130 may be integrated with base station 120 as a single device. In another example, tracking device 130 may be included within core network 150.

Apps server 140 may include one or more server devices, or other types of computation or communication devices, that gather, process, search, and/or provide information in a manner described herein. Apps server 140 may provide data to push application software and content to user device 110. For example, apps server 140 may provide apps and associated metadata that may be downloaded (via core network 150 and other network 160) by user device 110. In one implementation, apps server 140 may provide apps that utilize inherent capabilities of user device 110 to transmit data without direct customer involvement. Apps server 140 may communicate with a variety of other components, such as databases, gateways, web servers, network switches or routers, television broadcast facilities, and other servers to facilitate providing particular apps to customers. In an implementation, apps from apps server 140 may include metadata to facilitate searching and identification (of the apps) by a monitoring tool that may reside on user device 110 and/or tracking device 130.

Core network 150 may include one or more resources (e.g., devices, components, etc.) that transfer/receive information (e.g., voice, data, broadband applications, etc.) to a circuit-switched and/or packet-switched network. In one implementation, core network 150 may include resources such as, for example, a radio network controller (RNC), a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices. In another implementation, core network 150 may include other network elements, such as a policy and charging rule function (PCRF), a packet data network (PDN) gateway (PGW), and/or a home subscriber server (HSS). In one implementation, core network 150 may include a wireless access network.

Other network 160 may include one or more networks, such as another wireless network, a satellite network, the Internet, a telephone network, such as the Public Switched Telephone Network (PSTN), a metropolitan area network (MAN), a wide area network (WAN), a local area network (LAN), a mesh network, or another type of network. In an example implementation, other network 160 may include a combination of networks and other components (e.g., switches, routers, etc.) for transmitting data to and from user device 110, apps server 140, other user devices, and/or other servers (not shown).

Although FIG. 1 shows example components of network 100, in other implementations, network 100 may contain fewer components, different components, differently arranged components, or additional components than depicted in FIG. 1.

Figure 2:
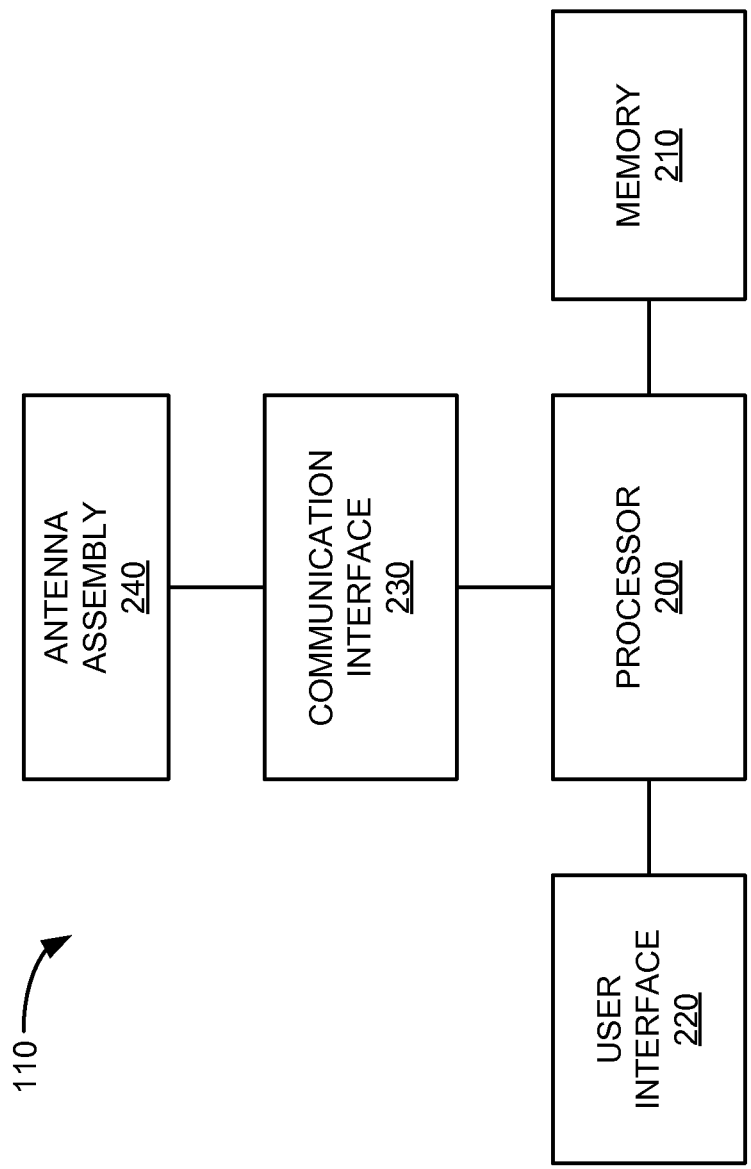
FIG. 2 is a diagram of example components of a user device of FIG. 1.

FIG. 2 is a diagram of example components of user device 110. As illustrated, user device 110 may include a processor 200, a memory 210, a user interface 220, a communication interface 230, and/or an antenna assembly 240.

Processor 200 may include one or more microprocessors, application specific integrated circuits (ASICs), field programmable gate arrays (FPGAs), or the like. Processor 200 may control operation of user device 110 and its components.

In one implementation, processor 200 may control operation of components of user device 110 in a manner described herein.

Memory 210 may include a random access memory (RAM), a read-only memory (ROM), and/or another type of memory to store data and instructions that may be used by processor 200.

User interface 220 may include mechanisms for inputting information to user device 110 and/or for outputting information from user device 110. Examples of input and output mechanisms might include buttons (e.g., control buttons, keys of a keypad, a joystick, etc.); a speaker to receive electrical signals and output audio signals; a microphone to receive audio signals and output electrical signals; a display to receive touch input and/or to output visual information; a vibrator to cause user device 110 to vibrate; and/or a camera to receive video and/or images.

Communication interface 230 may include, for example, a transmitter that may convert baseband signals from processor 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive radio frequency (RF) signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network.

As will be described in detail below, user device 110 may perform certain operations described herein in response to processor 200 executing software instructions of an application contained in a computer-readable medium, such as memory 210. A computer-readable medium may be defined as a physical or logical memory device. A logical memory device may include a space within a single physical memory device or spread across multiple physical memory devices. The software instructions may be read into memory 210 from another computer-readable medium or from another device via communication interface 230. The software instructions contained in memory 210 may cause processor 200 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows example components of user device 110, in other implementations, user device 110 may contain fewer components, different components, differently arranged components, or additional components than depicted in FIG. 2. Alternatively, or additionally, one or more components of user device 110 may perform one or more other tasks described as being performed by one or more other components of user device 110.

Figure 3:
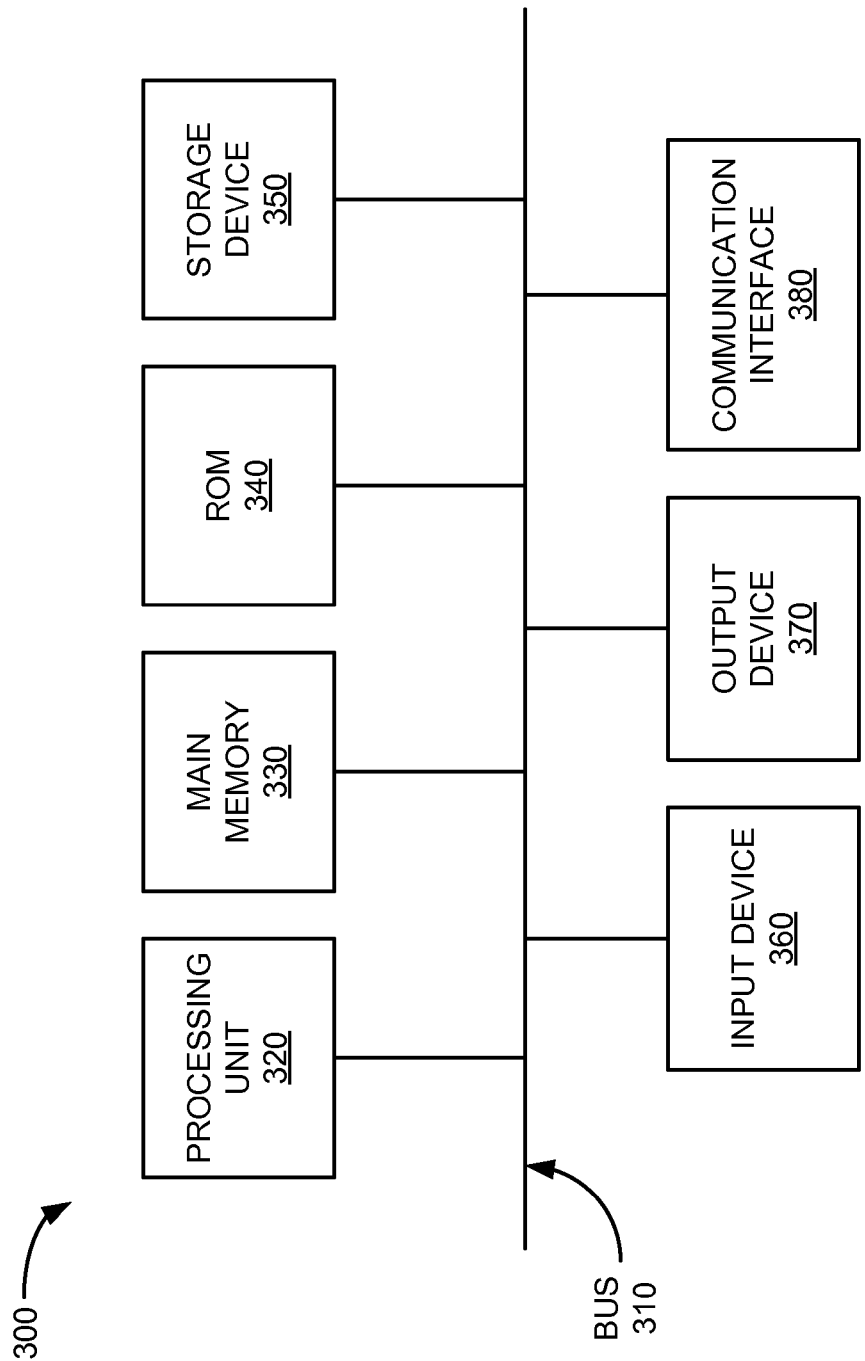
FIG. 3 diagram of example components of one or more of the other devices of the network depicted in FIG. 1.

FIG. 3 is a diagram of example components of a device 300 that may correspond to tracking device 130 and/or apps server 140. In another implementation, device 300 may also correspond to user device 110. As illustrated, device 300 may include a bus 310, a processing unit 320, a main memory 330, a ROM 340, a storage device 350, an input device 360, an output device 370, and/or a communication interface 380.

Bus 310 may include a path that permits communication among the components of device 300.

Processing unit 320 may include one or more processors, microprocessors, or other types of processing units that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

Figure 4:
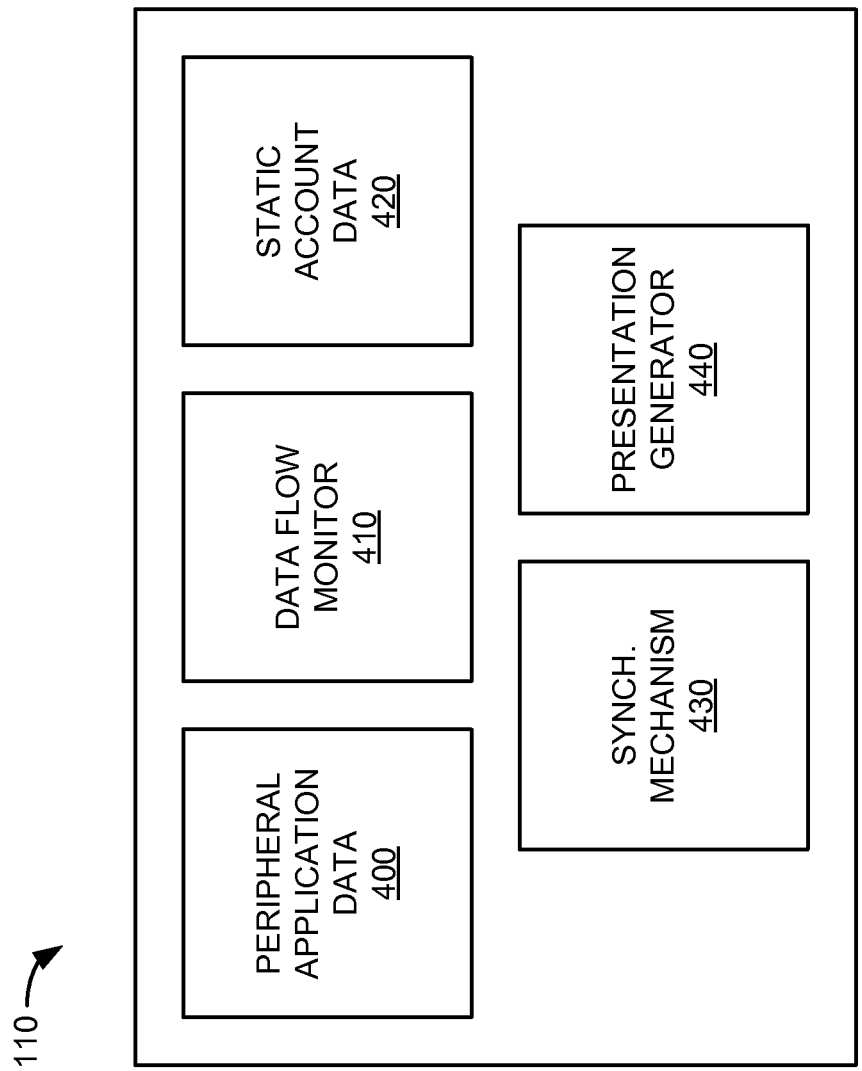
FIG. 4 is a diagram of example functional components of the user device depicted in FIG. 1.

FIG. 4 is a diagram of example functional components of user device 110. In one implementation, the functions described in connection with FIG. 4 may be performed by one or more components of user device 110 illustrated in FIG. 2. In another implementation, the functions described in connection with FIG. 4 may be performed by one or more components of device 300 (FIG. 3). As shown in FIG. 4, user device 110 may include peripheral application data 400, a data flow monitor 410, account data 420, a synchronization mechanism 430, and a presentation generator 440.

Peripheral application data 400 may include information about applications that may generate data flows between user device 110 and apps server 140 (or another device). Peripheral application data 400 may, for example, be used to identify data flows to/from peripheral applications stored on user device 110. Peripheral application data 400 may include, for example, an application name, an application version, or other identification information that may be used to associate a particular application with, for example, a particular session initiation protocol (SIP) session, socket, or tunnel.

Data flow monitor 410 may include hardware or a combination of hardware and software that associates data flows with particular applications that reside on user device 110. For example, data flow monitor 410 may identify a call for a data session that is initiated by a particular application by matching application identification information (e.g., from peripheral application data 400) with session setup information. Data flow monitor 410 may associate the data session with the initiating application and may track data usage for the session. In one implementation, data flow monitor 410 may store (e.g., in memory 210) the tracked data as data transfer statistics associated with the particular application. For example, data flow monitor 410 may store data for a limited time (e.g., one billing cycle). In another implementation, data flow monitor 410 may provide the tracked data to another storage device (e.g., a device in core network 150). In one implementation, data flow monitor 410 may monitor multiple sessions and/or applications. Further details of data flow monitor 410 are provided below in the connection with FIG. 5.

Static account data 420 may include information about a user's data subscription plan and/or subscription profile. For example, static account data 420 may include information about a subscriber's billing plan for data (e.g., per-MB fees, pre-paid MB limits, unlimited access, etc.). In one implementation, the subscriber's billing plan may include, for example, shared data limits among multiple devices (e.g., a "family plan"). In one implementation, updates to static account data 420 may be initiated by, for example, tracking device 130, when a subscriber's billing plan is changed.

Synchronization mechanism 430 may include hardware or a combination of hardware and software that may update static account data 420 and/or other data based on information received from tracking device 130 and/or core network 150. In one implementation, synchronization mechanism 430 may send a signal to tracking device 130 and/or core network 150 to determine a most recent version of account data stored on the network. Synchronization mechanism 430 may automatically request updated information when the version of static account data 420 does not match the most recent version of account data stored on the network.

Presentation generator 440 may include hardware or a combination of hardware and software that provide a data usage indication, segregated by application, to a user. For example, presentation generator 440 may retrieve stored data transfer statistics from data flow monitor 410 and data subscription plan information from static account data 420. In one implementation, presentation generator 440 may present data transfer statistics for particular applications in relation to limits in the subscriber's billing plan. For example, when a user has a data subscription plan with a pre-paid data limit (e.g., a set number of MB), presentation generator 440 may present data transfer statistics for particular applications in relation to the data limit (e.g., a percentage of the pre-paid data limit).

In another implementation, presentation generator 440 may present data transfer statistics for particular applications in relation to each other. For example, when a user has a data subscription plan with unlimited data rates or no pre-paid data rates, presentation generator 440 may present data transfer statistics for particular applications in relation to each other instead of a percentage of a set limit. In another implementation, where data limits are shared among multiple devices, presentation generator 440 may retrieve (e.g., from core network 150) data usage statistics for other devices in the shared data plan. Presentation generator 440 may present the data transfer statistics for particular applications in relation to the total data limit and/or the remaining availability for the shared data plan. Examples of user interfaces generated by presentation generator 440 are provided below in the connection with FIGS. 6A-6C.

Although FIG. 4 shows example functional components of user device 110, in other implementations, user device 110 may contain fewer functional components, different functional components, differently arranged functional components, or additional functional components than depicted in FIG. 4. Alternatively, or additionally, one or more functional components of user device 110 may perform one or more other tasks described as being performed by one or more other functional components of user device 110.

Figure 5:
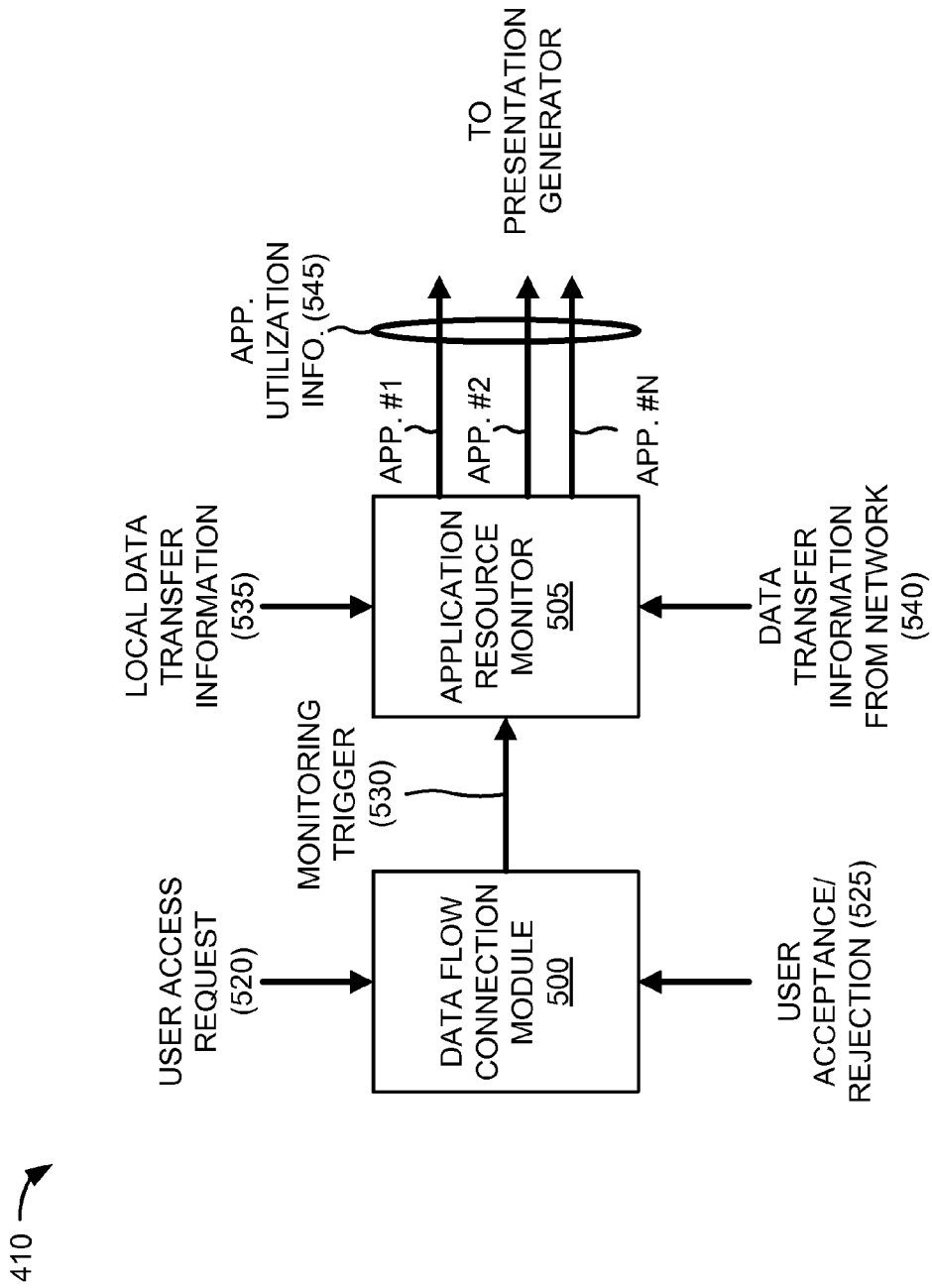
FIG. 5 is a diagram of example functional components of a data flow monitor depicted in FIG. 4.

FIG. 5 is a diagram of example functional components of data flow monitor 410. In one implementation, the functions described in connection with FIG. 5 may be performed by one or more components of user device 110 illustrated in FIG. 2. In another implementation, the functions described in connection with FIG. 5 may be performed by one or more components of device 300 (FIG. 3). As shown in FIG. 5, data flow monitor 410 may include a data flow connection module 500 and an application resource monitor 505

Data flow connection module 500 may include hardware or a combination of hardware and software that may track a user access request 520 from user device 110 (e.g., to a network device of core network 150). In one example, user access request 520 may include a request to access one or more resources of core network 150 (e.g., so that user device 110 may execute one or more applications). Data flow connection module 500 may receive an indication of whether user access request's 520 requested access is granted (e.g., user device 110 is permitted to access core network 150), as indicated by reference number 525, based on a determination (e.g., by core network 150) of whether user device 110 is authenticated. If authenticated, data flow connection module 500 may provide a monitoring trigger 530 to application resource monitor 505 to track the data flow associated with user access request 520.

Application resource monitor 505 may include hardware or a combination of hardware and software that may receive monitoring trigger 530 and local data transfer information 535 associated with user device 110 (e.g., information regarding data sent to and/or received from base station 120). In one implementation, monitoring trigger 530 may indicate that an active session has been established and cause application resource monitor 5050 to track the data flow associated with user access request 520. Local data transfer information 535 may include, for example, cumulative usage (e.g., in MB) detected by user device 110, bandwidth utilization detected by user device 110, traffic rates (e.g., in packets per second) associated with user device 110, etc. Alternatively, or additionally, application resource monitor 505 may receive data transfer information from a network (e.g., core network 150), as indicated by reference number 540. Data transfer information 540 may include, for example, cumulative usage (e.g., in MB) detected by network 150, bandwidth utilization detected by network 150, traffic rates (e.g., in packets per second) for user device 110 as detected by core network 150, etc. In one implementation, data transfer information 540 may include data traffic classifications, based, for example, on data traffic inspections performed by tracking device 130.

Application resource monitor 505 may determine whether a portion of data transfer information 535/540 is attributable to particular applications of user device 110, and may output the determined portion as application utilization information 545 that is associated with particular applications. As shown in FIG. 5, application utilization information 545 may include separate statistics for each tracked application (e.g., application #1, application #2, . . . , application #N). In one implementation, application utilization information 545 may be output to presentation generator 440 for eventual presentation to a user of user device 110. In another implementation, application utilization information 545 may be output to tracking device 130 and/or core network 150 for generating a presentation that can be provided by user device 110.

Although FIG. 5 shows example functional components of data flow monitor 410, in other implementations, data flow monitor 410 may contain fewer functional components, different functional components, differently arranged functional components, or additional functional components than depicted in FIG. 5. Alternatively, or additionally, one or more functional components of data flow monitor 410 may perform one or more other tasks described as being performed by one or more other functional components of data flow monitor 410.

Figure 6A:
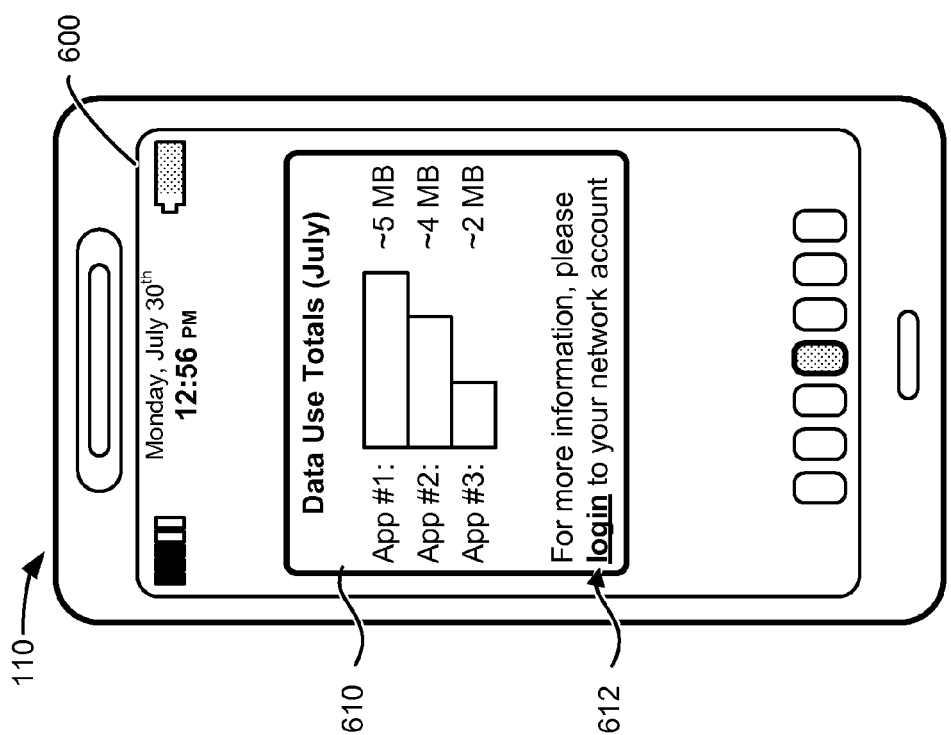

FIGS. 6A-6C are diagrams of example user interfaces of application-specific data usage that may be presented on a user device according to implementation herein. FIG. 6A provides an example view of user device 110, including a display screen 600, with a data use profile 610 displayed. Data use profile 610 may be generated, for example, by presentation generator 440 described above. Data use profile 610 may include a representation of data use associated with particular applications (e.g., "App #1," "App #2," and "App #3") for a particular period (e.g., "July"). As shown in FIG. 6A, data use profile 610 includes data transfer statistics for each of the particular applications that are shown in relation to each other (e.g., to provide a comparison of usage by each application). Data use profile 610 may be suitable, for example, when a user has a data subscription plan with unlimited data rates or no pre-paid data rates. As further shown in FIG. 6A, in one implementation, data transfer statistics may be shown with graphical representations (e.g., a bar chart) and/or approximate values (e.g., ~5 MB) to provide a user with sufficient information to identify particular application behaviors (e.g., data usage), but not enough detail to be relied upon in place of billing rates tracked by, for example, core network 150. In other implementations, actual billable data usage may be shown in data use profile 610. In one implementation, each particular application designator (e.g., "App #1," "App #2," and "App #3") may include a link that may be selected to obtain addition usage data for the selected application. In another implementation, data use profile 610 may include a link 612 that may allow a user to access a subscriber's network account.

FIG. 6B provides an example view of a data use profile 620, which may be presented on display screen 600 of user device 110 (not shown in FIG. 6B). Data use profile 620 may be generated, for example, by presentation generator 440 described above. Data use profile 620 may include a representation of data use associated with particular applications (e.g., "App #1," "App #2," "App #3," and "App #4") for a particular period (e.g., "July"). As shown in FIG. 6B, data use profile 620 may include data transfer statistics for each of the particular applications that are shown in relation to each other (e.g., to provide a comparison of usage by each application) and to an overall limit. Data use profile 620 may be suitable, for example, when a user has a data subscription plan with a limited (e.g., pre-paid) data rate. As further shown in FIG. 6B, in one implementation, data transfer statistics may be shown with graphical representations (e.g., a pie chart) to provide a user with sufficient information to identify particular application behaviors (e.g., data usage), but not enough detail to be relied upon in place of billing rates tracked by, for example, core network 150. In one implementation, each particular application designator (e.g., "App #1," "App #2," "App #3,"

and "App #4") may include a link that may be selected to obtain additional usage data for the selected application. In another implementation, data use profile 620 may include a link 622 that may allow a user to access a subscriber's network account.

FIG. 6C provides an example view of a data use report 630 for a particular application. Data use report 630 may, for example, be presented in response to a user selecting a link associated with a particular application designator (e.g., "App #2") from data use profile 610/620. Data use report 630 may include, for example, a timeline of recent data usage (e.g., MB used) associated with a selected application over a particular time period. The timeline of data usage report 630 may, for example, allow a user to identify periods of high data transfers that may (or may not) correspond to intentional use of a mobile data network.

Although FIGS. 6A-6C show exemplary user interfaces associated with user device 110, in other implementations, user device 110 may present user interfaces with different or additional information than depicted in FIGS. 6A-6C.

FIG. 7 is a diagram of example functional components of tracking device 130. In one implementation, the functions described in connection with FIG. 6 may be performed by one or more components of device 300 (FIG. 3). As shown in FIG. 7, tracking device 130 may include a network resource mechanism 700, account data 710, and a presentation generator 720.

Network resource mechanism 700 may include hardware or a combination of hardware and software that may provide admission control for a user device (e.g., user device 110) attempting to access core network 150, and may monitor utilization (e.g., by user device 110) of components of core network 150. Network resource mechanism 700 may detect packet data traffic patterns associated with each user device 110, and may classify the detected packet data traffic patterns. The classified traffic patterns may, for example, correspond to an application and/or type of application residing on user device 110. In one implementation, network resource mechanism 700 may store (e.g., in memory 330) the classified traffic patterns as data transfer statistics associated with the particular user device 110. For example, network resource mechanism 700 may store data for a limited time (e.g., one billing cycle). In one implementation (e.g., when user device 110 includes functional components to process the network data), the classified traffic patterns may correspond to data transfer information 540, described above, that network resource mechanism 700 may supply to user device 110 (e.g., application resource monitor 505). Further details of network resource mechanism 700 are provided below in the connection with FIG. 8.

Account data 710 may include information about a user's data subscription plan and/or subscription profile. For example, account data 710 may include information about a subscriber's billing plan for data (e.g., per-MB fees, pre-paid MB limits, unlimited access, etc.). In one implementation, the subscriber's billing plan may include, for example, shared data limits among multiple devices (e.g., a "family plan"). In an implementation, account data 710 may be retrieved (e.g., by core device 130) from another network device within core network 130. Account data 710 may also include shared usage data (e.g., family plan data) that may be retrieved by particular user devices 110.

In one implementation, account data 710 may also include an indication of whether a particular user device includes a monitoring client (or a particular version of a monitoring client) that may enable user device 110 to monitor application-based data usage locally. A monitoring client may include, for example, one or more functional components described above in connection with FIGS. 4 and 5. Depending on whether a monitoring client (or a particular version of a monitoring client) is available on user device 110, tracking device 130 may determine what level of activity is required by network resource mechanism 700 and/or presentation generator 720 to support the monitoring of application-based data usage for user device 110. For example, if tracking device 130 identifies a monitoring client for user device 110, tracking device 130 may send usage data as raw data to support the monitoring of application-based data usage for user device 110. Conversely, if tracking device 130 fails to identify a monitoring client for user device 110, tracking device 130 may provide graphical representation of the raw data that may simply be displayed by user device 110.

Presentation generator 720 may include hardware or a combination of hardware and software that provides a data usage indication to user device 110. In one implementation, presentation generator 720 may retrieve stored data transfer statistics from user device 110 (e.g., data flow monitor 410) and data subscription plan information from account data 710. In another implementation, presentation generator 720 may retrieve traffic classification information from network resource mechanism 700 and data subscription plan information from account data 710. Presentation generator 720 may provide to user device 110, for example, a user interface that may be presented to a user. Presentation generator 720 may provide the user interface, for example, if user device 110 is not equipped to generate a user interface locally. Formats for user interfaces provided by presentation generator 720 may include information similar to that described above in connection with FIGS. 6A-6C.

Although FIG. 7 shows example functional components of tracking device 130, in other implementations, tracking device 130 may contain fewer functional components, different functional components, differently arranged functional components, or additional functional components than depicted in FIG. 7. Alternatively, or additionally, one or more functional components of tracking device 130 may perform one or more other tasks described as being performed by one or more other functional components of tracking device 130.

Figure 8:
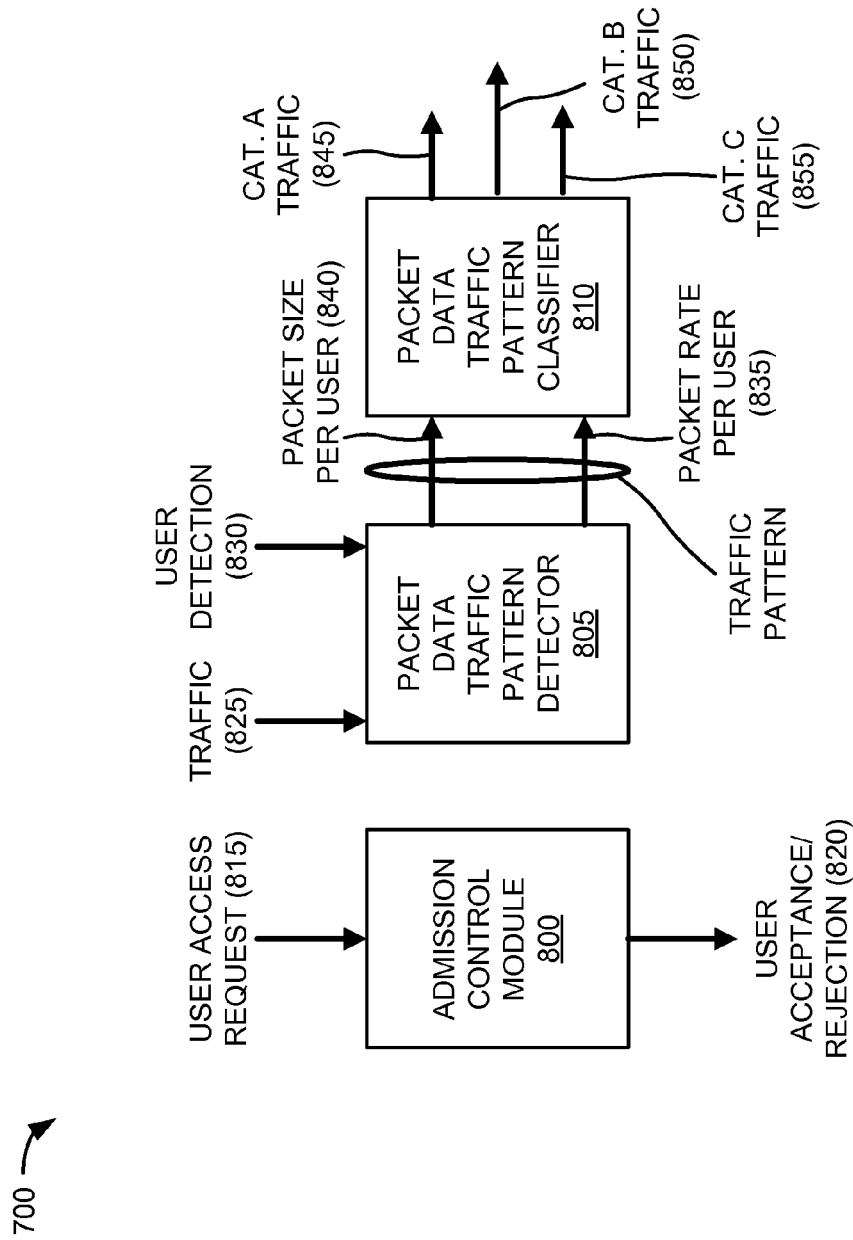
FIG. 8 is a diagram of example functional components of a network resource mechanism depicted in FIG. 7.

FIG. 8 is a diagram of example functional components of network resource mechanism 700. In one implementation, the functions described in connection with FIG. 8 may be performed by one or more components of device 300 (FIG. 3). As shown in FIG. 8, network resource mechanism 700 may include an admission control module 800, a packet data traffic pattern detector 805, and a packet data traffic pattern classifier 810.

Admission control module 800 may include hardware or a combination of hardware and software that may receive a user access request 815 from user device 110. In one example, user access request 815 may include a request to access one or more resources of core network 150 (e.g., so that user device 110 may execute one or more applications). Admission control module 800 may determine whether user device 110 is an authenticated device (e.g., a device permitted to access core network 150), and may accept or reject user access request 815, as indicated by reference number 820, based on the determination of whether user device 110 is authenticated.

Packet data traffic pattern detector 805 may include hardware or a combination of hardware and software that may receive traffic 825 associated with a user device (e.g., user device 110) and may detect user device 110, as indicated by reference number 830. Based on traffic 825 and detection 830 of user device 110, packet data traffic pattern detector 805 may determine packet rate per user information 835 and packet size per user information 840 for each of the multiple user devices. Packet rate per user information 835 may include a number of packets transmitted and/or received by user device 110 in a particular number ("X") of seconds. Packet size per user information 840 may include a total packet data size ("Y") in a particular number of bytes transmitted and/or received by user device 110 in a particular number ("X") of seconds. In one example, packet size per user information 840 may include aggregated total packet data sizes transmitted and/or received by user device 110. As further shown in FIG. 8, packet rate per user information 835 and packet size per user information 840 may correspond to a traffic pattern associated with user device 110, base station 120, and/or core network 150. Packet data traffic pattern detector 805 may provide packet rate per user information 835 and packet size per user information 840 to packet data traffic pattern classifier 810.

Packet data traffic pattern classifier 810 may include hardware or a combination of hardware and software that may receive packet rate per user information 835 and packet size per user information 840 (e.g., the traffic pattern) from packet data traffic pattern detector 805, and may classify traffic associated with the traffic pattern. The classified traffic may, for example, be associated with one or more applications residing on user device 110. In one example, packet data traffic pattern classifier 810 may classify the traffic as category "A" traffic 845, category "B" traffic 850, or category "C" traffic 855. Category "A" traffic 845 may include high throughput traffic (e.g., traffic having a ratio (Y/X) that is greater than a particular throughput threshold). Category "B" traffic 850 may include low packet data size traffic (e.g., traffic having a total packet data size (Y) that is smaller than a particular packet size threshold). Category "C" traffic 855 may include high frequency packet interval traffic (e.g., traffic receiving packets at an interval (e.g., as determined by X) that is less than a particular interval threshold). In one implementation, the particular throughput threshold, the particular packet size threshold, and/or the particular interval threshold may be determined by a user (e.g., a network administrator). In other implementations, more and/or different traffic categories may be used.

Although FIG. 8 shows example functional components of network resource mechanism 700, in other implementations, network resource mechanism 700 may contain fewer functional components, different functional components, differently arranged functional components, or additional functional components than depicted in FIG. 8. Alternatively, or additionally, one or more functional components of network resource mechanism 700 may perform one or more other tasks described as being performed by one or more other functional components of network resource mechanism 700.

Figure 9:
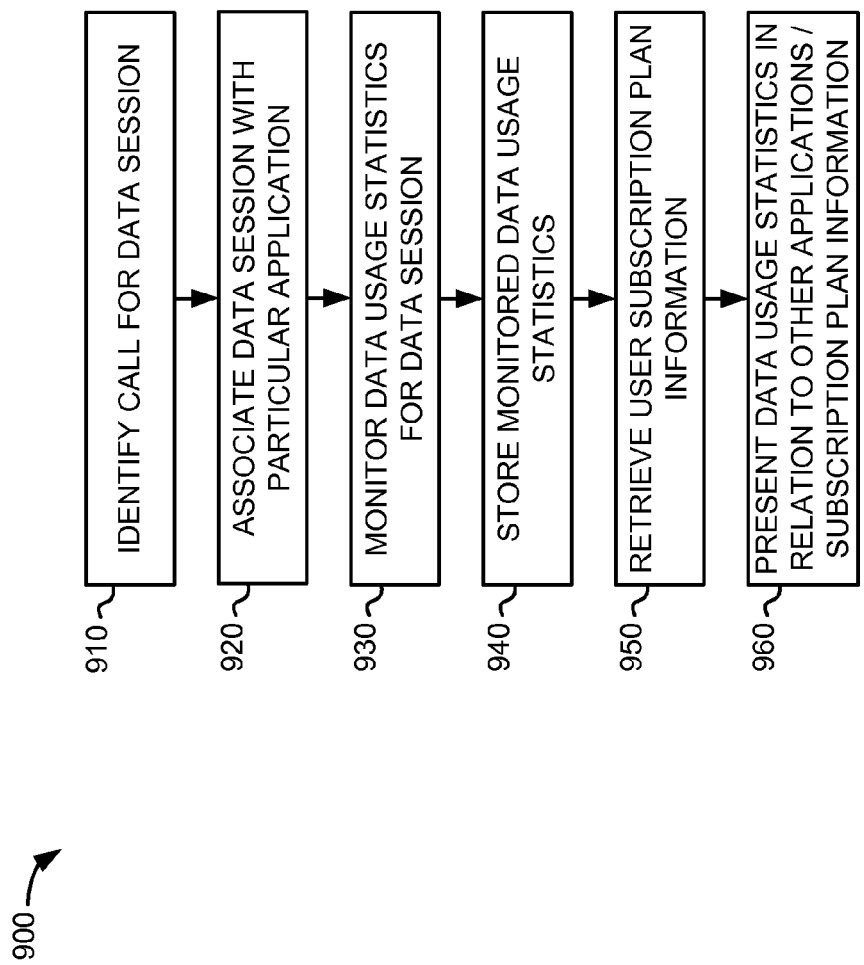
FIG. 9 is a flow chart of an example process for monitoring application-based data usage according to implementations described herein.

FIG. 9 is a flow chart of an example process 900 for monitoring application-based data usage according to implementations described herein. In one implementation, process 900 may be performed by user device 110. In another implementation, some or all of process 900 may be performed by another device or group of devices, including or excluding user device 110.

As illustrated in FIG. 9, process 900 may include identifying a call for a data session (block 910), associating the data session with a particular application (block 920), and monitoring data usage statistics for the data session (block 930). For example, in implementations described above in connection with FIG. 4, user device 110 (e.g., data flow monitor 410) may identify a call for a data session that is initiated by a particular application by matching application identification information (e.g., from peripheral application data 400) with session setup information. Data flow monitor 410 may associate the data session with the initiating application and may track data usage for the session. Data flow monitor 410 (e.g., application resource monitor 505 of FIG. 5) may receive local data transfer information 535 associated with user device 110 (e.g., information regarding data sent to and/or received from base station 120) and/or data transfer information from a network (e.g., core network 150), as indicated by reference number 540.

Returning to FIG. 9, process 900 may include storing the monitored data usage statistics (block 940). For example, in implementations described above in connection with FIG. 4, user device 110 (e.g., data flow monitor 410) may store (e.g., in memory 210) the tracked data as data transfer statistics associated with the particular application. For example, data flow monitor 410 may store data for a limited time (e.g., one billing cycle). In another implementation, data flow monitor may provide the tracked data to another storage device (e.g., a device in core network 150).

As further shown in FIG. 9, process 900 may include retrieving user subscription plan information (block 950), and presenting data usage statistics in relation to other applications and/or the subscription plan information (block 960). For example, in implementations described above in connection with FIG. 4, user device 110 (e.g., presentation generator 440) may retrieve stored data transfer statistics from data flow monitor 410 and data subscription plan information from static account data 420. In one implementation, presentation generator 440 may present data transfer statistic for particular applications in relation to limits in the subscriber's billing plan. In another implementation, presentation generator 440 may present data transfer statistic for particular applications in relation to each other.

Figure 10:
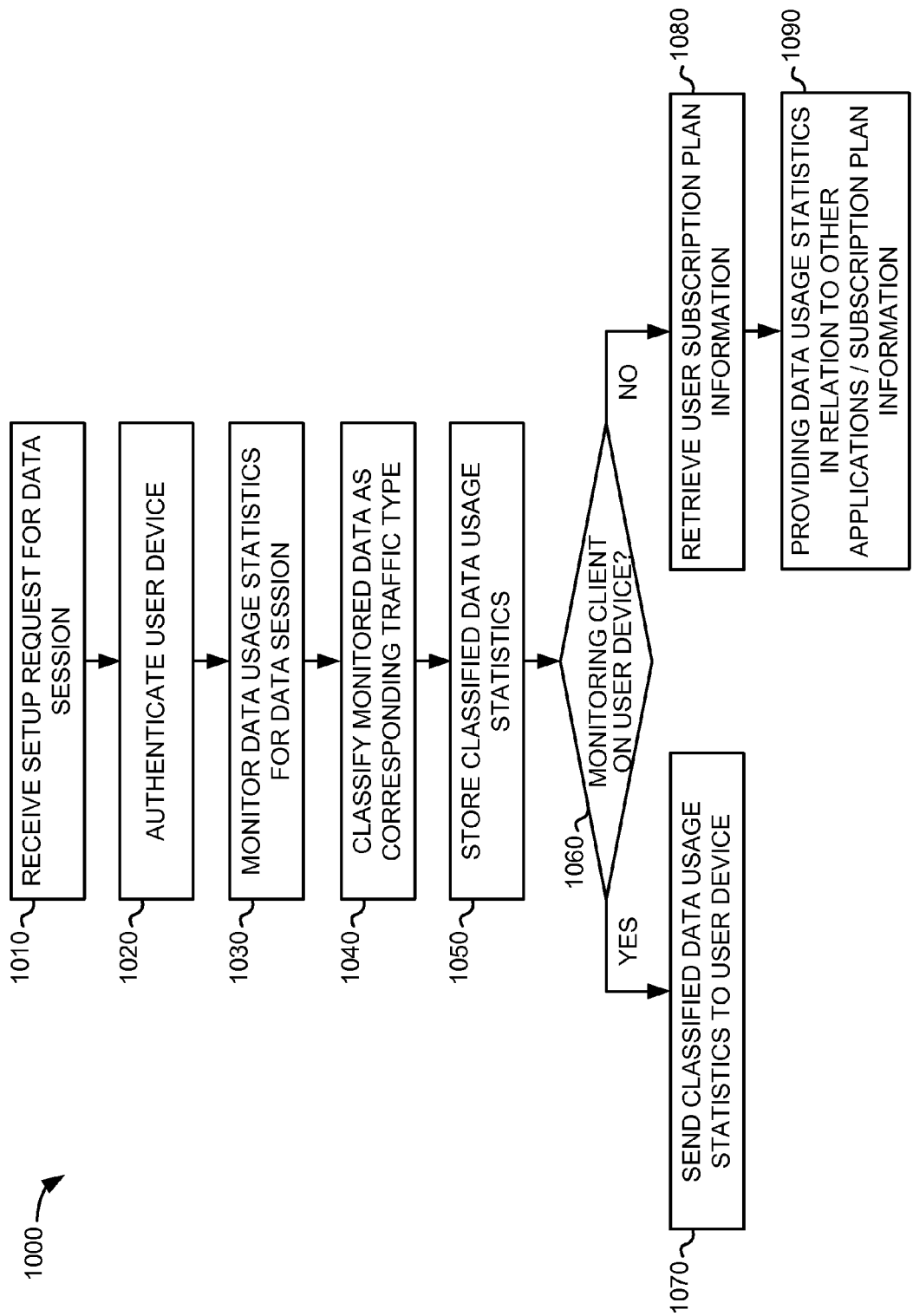
FIG. 10 is a flow chart of another example process for monitoring application-based data usage according to implementations described herein.

FIG. 10 is a flow chart of another example process 1000 for monitoring application-based data usage according to implementations described herein. In one implementation, process 1000 may be performed by tracking device 130. In another implementation, some or all of process 1000 may be performed by another device or group of devices, including or excluding tracking device 130.

As illustrated in FIG. 10, process 1000 may include receiving a setup request for a data session (block 1010), authenticating a user device (block 1020), monitoring data usage statistics for the data session (block 1030), and classifying a traffic type of the monitored data (block 1040). For example, in implementations described above in connection with FIG. 7, tracking device 130 (e.g., network resource mechanism 700) may provide admission control for a user device (e.g., user device 110) attempting to access core network 150, and may monitor utilization (e.g., by user device 110) of components of core network 150. Network resource mechanism 700 may detect packet data traffic patterns associated with each user device 110, and may classify the detected packet data traffic patterns. The classified traffic patterns may, for example, correspond to an application and/or type of application residing on user device 110. In one implementation, the classified traffic patterns may correspond to data transfer information 540, described above, that may be supplied to user device 110 (e.g., application resource monitor 505).

As further shown in FIG. 10, process 1000 may include storing the classified data usage statistics (block 1050), and determining if a monitoring client is available on the user device (block 1060). For example, in implementations described above in connection with FIG. 7, tracking device 130 (e.g., network resource mechanism 700) may store (e.g., in memory 330) the classified traffic patterns as data transfer statistics associated with the particular user device 110. In one implementation, tracking device 130 (e.g., account data 710) may also include an indication of whether a particular user device includes a monitoring client (or a particular version of a monitoring client) that may enable user device 110 to monitor application-based data usage locally. A monitoring client may include, for example, one or more functional components described above in connection with FIGS. 4 and 5. Depending on whether a monitoring client (or a particular version of a monitoring client) is available on user device 110, tracking device 130 may determine what level of communication is required by network resource mechanism 700 and/or presentation generator 730 to support the monitoring of application-based data usage for user device 110.

As further shown in FIG. 10, if a monitoring client is available on the user device (block 1060—YES), process 1000 may include sending classified data usage statistics to the user device (block 1070). If a monitoring client is not available on the user device (block 1060—NO), process 1000 may include retrieving user subscription plan information (block 1080) and providing data usage statistics in relation to other applications and/or the subscription plan information (block 1090). For example, in implementations described above in connection with FIG. 7, when user device 110 includes functional components to process the network data, the classified traffic patterns may correspond to data transfer information 540, described above, that network resource mechanism 700 may supply to user device 110 (e.g., application resource monitor 505). Otherwise, tracking device (e.g., presentation generator 720) may retrieve traffic classification information from network resource mechanism 700 and data subscription plan information from account data 710. Presentation generator 720 may provide to user device 110, for example, a graphical user interface that may be presented to a user. Presentation generator 720 may provide the user interface, for example, if user device 110 is not equipped to generate a user interface locally.

Systems and/or methods described herein may associate a data session with a particular application, of a user device, that initiated the data session and may monitor network data usage for the data session. The systems and/or methods may store statistics for the network data usage associated with the particular application. The systems and/or methods may further retrieve subscription plan information associated with the user device and may present, on a display, the statistics for the network data usage associated with the particular application and in relation to the subscription plan information associated with the user device.

The systems and/or methods may, thus, inform a customer (e.g., the user of the user device) of what applications are sending/receiving data and how much data each application is using. This information would allow the customer, for example, to uninstall applications that generate high billable usage, to encourage developers to improve application behavior, and/or to take other corrective actions to limit unintended use of network resources.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9 and 10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    associating, by a user device, a data session with a particular application of a group of applications, residing on the user device, that initiated the data session via a network;
    monitoring, by the user device, network data usage for the data session;
    storing, by the user device, statistics for the network data usage associated with the particular application;
    retrieving, by the user device, data subscription plan information, associated with the user device, for the network; and
    presenting, by the user device and to a user, representations of the statistics for the network data usage associated with the particular application of the group of applications and in relation to both the data subscription plan information associated with the user device and usage data for other applications of the group of applications residing on the user device.

2. The method of claim 1, wherein the data subscription plan information includes one or more of:
    a per-megabyte (MB) fee for data usage via the network, or
    a pre-paid MB limit for data usage via the network.

3. The method of claim 1,
    wherein the representations provide sufficient information to identify particular application behaviors without enough detail to be relied upon in place of actual billing data.

4. The method of claim 1, wherein
    the representations include a graphical representation, and
        wherein the graphical representation includes a link for each application in the group of applications, and
        wherein each of the links provides a data usage report for a corresponding application.

5. The method of claim 1, wherein retrieving the data subscription plan information associated with the user device includes one or more of:
    retrieving the data subscription plan information from a memory within the user device, or
    retrieving the data subscription plan information from a device associated with the network.

6. The method of claim 1, wherein the data subscription plan information associated with the user device includes one or more of:
  a per-megabyte (MB) fee for data usage over the network,
  a pre-paid MB limit for data usage over the network, or
  unlimited data usage over the network.

7. The method of claim 1, wherein associating the data session with the particular application, of the user device, that initiated the data session includes:
  matching setup information for the data session with stored application identification information for the group of applications.

8. The method of claim 1, further comprising:
  receiving, by the user device, network data usage information from a device associated with the network, where the statistics for the network data usage associated with the particular application include the network data usage information from the device associated with the network.

9. A computing device-implemented method, comprising:
  receiving, by the computing device and from a user device, a request to access a network;
  determining, by the computing device, whether to permit the user device to access the network based on the request;
  monitoring, by the computing device, traffic provided to or from the user device via the network to collect usage data;
  determining, by the computing device, a classification for the monitored traffic, wherein the classification corresponds to a type of application residing on the user device; and
  sending, by the computing device, the usage data and the classification to the user device, wherein the usage data and the classification are provided as a graphical representation of the usage data in relation to one or more of:
    usage data for other applications residing on the user device, or
    a pre-paid data limit based on a subscription plan for the user device.

10. The computing device-implemented method of claim 9, further comprising:
  retrieving, by the computing device, subscription plan information associated with the user device, where the subscription plan information includes a pre-paid data limit.

11. The computing device-implemented method of claim 10, where the subscription plan includes a shared data limit among multiple user devices.

12. The computing device-implemented method of claim 9, further comprising:
  storing, in a memory of the computing device, the usage data and the classification.

13. The computing device-implemented method of claim 9,
  wherein the graphical representation includes a link to a data usage report for each of the other applications.

14. The computing device-implemented method of claim 13, wherein the graphical representation includes approximate values for data usage.

15. A user device, comprising:
  a memory to store a plurality of instructions; and
  a processor to execute instructions in the memory to:
    associate a data session with a particular application, of a group of applications residing on the user device, that initiated the data session via a network,
    monitor network data usage for the data session to obtain statistics for the network data usage associated with the particular application, and
    present, on a display of the user device, representations of the statistics for the network data usage associated with the particular application of the group of applications and in relation to both subscription plan information associated with the user device and usage data for other applications of the group of applications residing on the user device.

16. The user device of claim 15, wherein the processor is further to execute instructions in the memory to:
  retrieve the subscription plan information, for the network, associated with the user device.

17. The user device of claim 15, where the processor is further to execute instructions in the memory to:
  associate another data session with a different application, of the user device, that initiated the other data session, and
  monitor network data usage for the other data session to obtain statistics for the network data usage associated with the different application.

18. The user device of claim 15, where the user device includes one of:
  a radiotelephone,
  a personal communications system (PCS) terminal,
  a personal digital assistant (PDA),
  a wireless device,
  a cellular telephone,
  a smart phone,
  a laptop computer,
  a digital camera,
  a global positioning system (GPS) device, or
  a portable gaming device.

19. A device, comprising:
  a memory to store a plurality of instructions; and
  a processor to execute instructions in the memory to:
    identify creation of a data session from a user device via a network,
    monitor traffic provided to or from the user device via the network to collect usage data,
    determine a classification for the monitored traffic, where the classification corresponds to a type of application residing on the user device,
    store, in the memory, the usage data and the classification associated with the data session, and
    send the usage data and the classification to the user device, wherein the usage data and the classification are provided as a representation of the usage data in relation to one or more of:
      usage data for other applications residing on the user device, or
      a pre-paid data limit based on a subscription plan for the user device.

20. The device of claim 19, where the device comprises:
  a tracking device associated with a base station.

21. The device of claim 19, where the processor is further to execute instructions in the memory to:
  retrieve subscription plan information, for the network, associated with the user device.

22. The device of claim 19, where the processor is further to execute instructions in the memory to:
  determine whether the user device includes a monitoring client to monitor application based data usage locally, and determine, based on whether the user device includes a monitoring client, a format to send the usage data and the classification to the user device.

23. The device of claim 22, where the format to send the usage data and the classification includes one or more of:
raw data of the usage data, or
a graphical representation of the usage data.

* * * * *